(12) United States Patent
Garrison

(10) Patent No.: US 6,701,867 B1
(45) Date of Patent: Mar. 9, 2004

(54) BIRDFEEDER WITH SELF CLEANING CONNECTION MECHANISM

(76) Inventor: William M. Garrison, 600 Lewis Mountain Rd., New Market, AL (US) 35761

( * ) Notice: Subject to any disclaimer, the term of this patent is extended or adjusted under 35 U.S.C. 154(b) by 0 days.

(21) Appl. No.: 10/374,379

(22) Filed: Feb. 26, 2003

(51) Int. Cl.$^7$ ............................................... A01K 39/01
(52) U.S. Cl. ..................... 119/57.8; 119/52.2; 119/52.1
(58) Field of Search .............................. 119/57.8, 57.9, 119/52.2, 52.3, 52.1

(56) References Cited

U.S. PATENT DOCUMENTS

| | | | |
|---|---|---|---|
| 2,591,126 A | * 4/1952 | Breck, Jr. | 119/52.2 |
| 4,030,451 A | * 6/1977 | Miller | 119/57.9 |
| 4,102,308 A | * 7/1978 | Kilham | 119/52.3 |
| 5,289,796 A | * 3/1994 | Armstrong | 119/52.3 |
| 5,829,382 A | * 11/1998 | Garrison | 119/52.2 |
| 6,253,707 B1 | * 7/2001 | Cote | 119/57.9 |
| 6,543,384 B2 | * 4/2003 | Cote | 119/57.9 |

* cited by examiner

Primary Examiner—Son T Nguyen
(74) Attorney, Agent, or Firm—Joseph H. Beumer

(57) ABSTRACT

A birdfeeder is made up of two subassemblies, one of them having a protective top and a lock rod extending downward from the center of the top and the other having a base with a cavity for receiving and holding bird feed, along with a reservoir, a tubular support member attached to the base and a locking mechanism attached to a reservoir wall and to the tubular support member. The lock rod, which extends only partially down the tubular support when engaged, has a groove near its lower end for receiving a spring-biased rod from the locking mechanism, connecting the two subassemblies together. A space between the lower end of the lock rod and the base allows any feed that has been spilled into the top of the tubular member in the course of loading the reservoir to fall downward away from components of the locking mechanism. Openings may also be provided in the base or in the tubular support member at location near the bottom for the same purpose. Keeping feed from reaching areas of operation of the locking mechanism avoids problems related to clogging and reassembling of the upper and lower portions of the birdfeeder.

12 Claims, 4 Drawing Sheets

BIRDFEEDER WITH SELF CLEANING CONNECTION MECHANISM

FIELD OF THE INVENTION

This invention relates to birdfeeders and more particularly to birdfeeder assemblies made up of upper and lower subassemblies joined together with a locking mechanism.

BACKGROUND OF THE INVENTION

While birdfeeders seperable into parts for filling with bird feed have been proposed, many of these birdfeeders that must be disassembled to be filled with bird feed are assembled with small parts that are prone to become lost during the process of refilling the birdfeeder. Additionally, manipulation of these parts and tools may be difficult where an individual is attempting to reassemble a birdfeeder after it has been filled with bird feed, leading to spillage and waste.

Also, birdfeeders of this type are typically provided with proportionally small feed reservoirs, requiring that the bird feeder must be frequently refilled. In addition to being inconvenient for users, a small feed reservoir may periodically allow the feed to become exhausted, discouraging birds from visiting the birdfeeder and causing them to seek food elsewhere. Further, many of these birdfeeders having relatively small reservoirs are provided with small openings by which to fill the reservoir, which may also result in spilled and wasted feed and attendant aggravation felt by the person refilling the birdfeeder. Further yet, many of the birdfeeders of the prior art provide the bird feed in areas that are insufficiently sheltered, in turn allowing the feed to become wetted by precipitation, resulting in spoilage of the feed and clogging of the birdfeeder. Such insufficiently sheltered birdfeeders also expose birds visiting the birdfeeder to precipitation.

To overcome the problems discussed above, the present applicant previously invented a birdfeeder separable into two main subassemblies for quickly and conveniently filling the birdfeeder with bird feed without potential loss of parts or need for associated tools. One of the subassemblies includes a protective top for protecting birds and feed from precipitation and a lock rod extending downward from the top, and the other subassembly has a base with at least one cavity for receiving feed, a relatively large feed reservoir connected to the base, a tubular upright support member extending upward from the base and a locking mechanism carried by the base for releasably engaging the lock rod. This prior invention is the subject of U. S. Pat. No. 5,829,382, issued Nov. 3, 1998, which patent is hereby expressly incorporated by reference.

While the invention as disclosed in the above-referenced patent is effective in most respects, further improvements would be desirable. In particular, the locking mechanism which engages a groove in the lock rod to secure the subassemblies together is located in the base disposed for horizontal movement of a locking pin into a groove, which is near the bottom of the lock rod, and the lock rod has its lower end disposed flush with the lower end of the upright tubular support member. As a result, if even a small amount of feed is inadvertently spilled into the top end of the tubular member in the process of filling the surrounding reservoir, the presence of such feed underneath the bottom end of the lock rod will interfere with its moving down far enough to come into register with the inserting pin of the locking mechanism. Removal of spilled feed particles from the tubular support member once the reservoir is filled is difficult, and total prevention of spillage into the tubular support member while handling a relatively large amount of feed is not likely to be realized. Thus a need exists for a measure which facilitates removing of feed or material that forms an obstruction to operation of the locking mechanism. Other improvements directed to cost reduction, ease of manufacturing and use would also be desirable as a byproduct.

It is therefore an object of this invention to provide a birdfeeder that is separable into two main subassemblies for quickly and conveniently filling the birdfeeder without potential loss of parts or need for associated tools.

Another object is to provide a birdfeeder having a relatively large feed reservoir and a protective top.

Yet another object is to provide such a birdfeeder having a vertically extending lock rod connected to a top and a locking member releaseably engaging the lock rod within a vertical support member, with means being provided to keep the region of engagement free of extraneous feed particles.

Still another object is to provide a passageway to enable escape of feed particles from a tubular suppport connected to a base component, for a birdfeeder either supported by means such as a ring at the top or mounted from below such as on a post.

SUMMARY OF THE INVENTION

The present invention is directed to a birdfeeder separable into two subassemblies, a first one comprising a protective top for protecting birds and bird feed from precipitation and having a lock rod extending downward from the top, with its lower end configured for receiving a locking member from a side direction. This subassembly includes a ring or other component for suspension of the bird feeder from above. The second subassembly has a base provided with at least one cavity for receiving and holding bird feed. The base may also be connected to a mounting structure for supporting the birdfeeder from below. A bird feed reservoir is attached to the base, and it is provided with at least one opening at a bottom end communicating with the cavity so that bird feed flows from the reservoir to the cavity as it is consumed. A tubular member extends from the base upward through the reservoir for guiding and supporting the lock rod inserted therein and to support one end of the locking mechanism.

The lock rod has a shortened length selected to place the bottom thereof in position spaced apart above the base, defining a vacant portion in the lower end of the tubular member, into which spilled feed particles could fall and move outward from the tubular member through an opening in the base without interfering with the connection of the lock rod and a locking mechanism. The locking mechanism includes a locking member such as a spring biased rod disposed in a housing for engagement with a groove or other receptacle in the lock rod. The housing is supported at one end by the reservoir wall and at the other end by being attached to the the tubular support by means such as a bracket, other mechanism or a one-piece molding, with the locking rod extending through an aperture in the tubular support.

In addition to eliminating problems related to operation of the locking mechanism which arise from the presence of particles of spilled feed at the area of operation, placing the locking mechanism at a much higher location and supporting it by the reservoir wall and the tubular support instead of embedding this component in the base adjacent the lower end of the support member provides other advantages.

Removal of a large portion of the lock rod results in a need for less material, and the shorter rod is easier to handle, while still being effective. Placement of the locking mechanism for being supported by walls of the reservoir and tubular member results in easier manufacturing and lower costs than would be involved in embedding this component in the base.

DESCRIPTION OF THE PREFERRED EMBODIMENT

The bird feeder of the instant invention is separable into two portions, with the mechanism for separating and holding the birdfeeder together being constructed completely integral with the two portions. As such, when separated, there are no small loose parts to become lost or which must be manipulated in order to reassemble the birdfeeder, or a need for tools to disassemble/assemble the birdfeeder. Additionally, capacity of the birdfeeder is such that it holds a relatively large quantity of bird feed, making the feed available on a more consistent basis and increasing the length of intervals between which the birdfeeder must be refilled.

Figure 1:
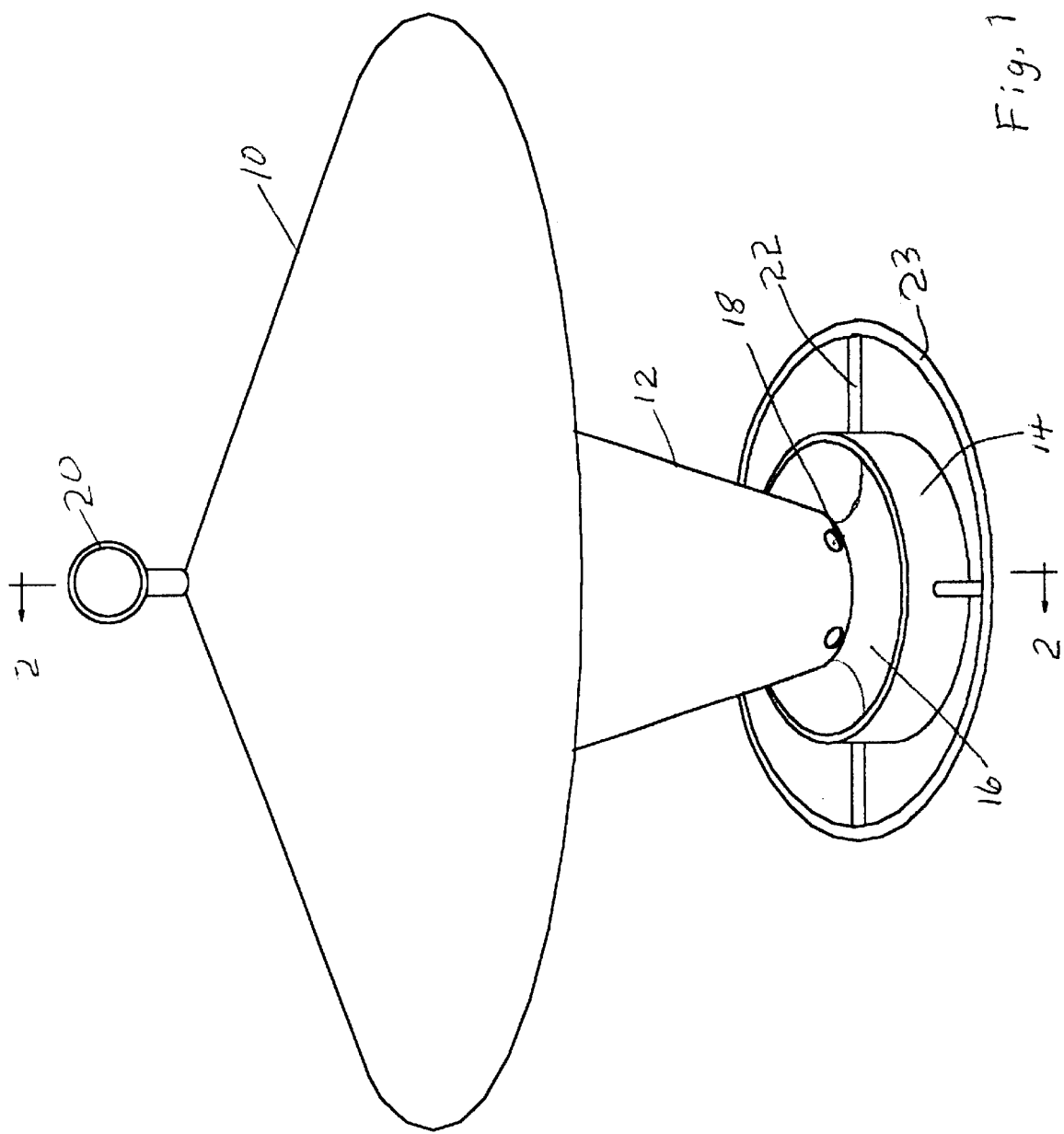
FIG. 1 is a pictorial view of one embodiment of a birdfeeder of the present invention.

Referring initially to FIG. 1, the birdfeeder of the instant invention is shown. A top 10 of metal, plastic or other material and which may be about 17 inches in diameter may be configured as a flattened cone and provides an area therebeneath sheltered from precipitation and direct sunlight. Additionally, such a large diameter top serves to deter squirrels from raiding the birdfeeder due to the relatively large overhang between the top and the base.

Figure 2:
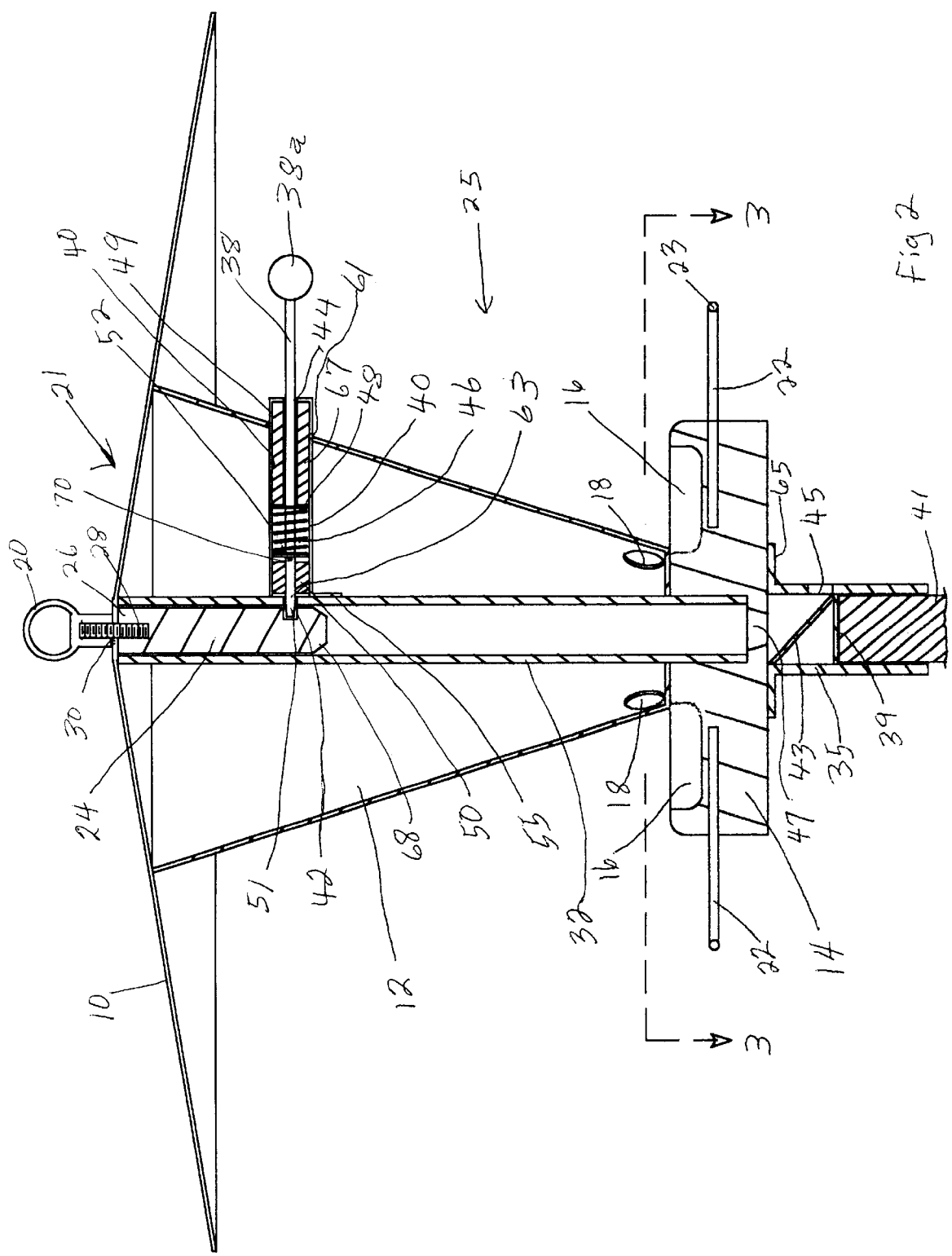
FIG. 2 is a cut-away view taken along lines 2—2 of FIG. 1.
Figure 3:
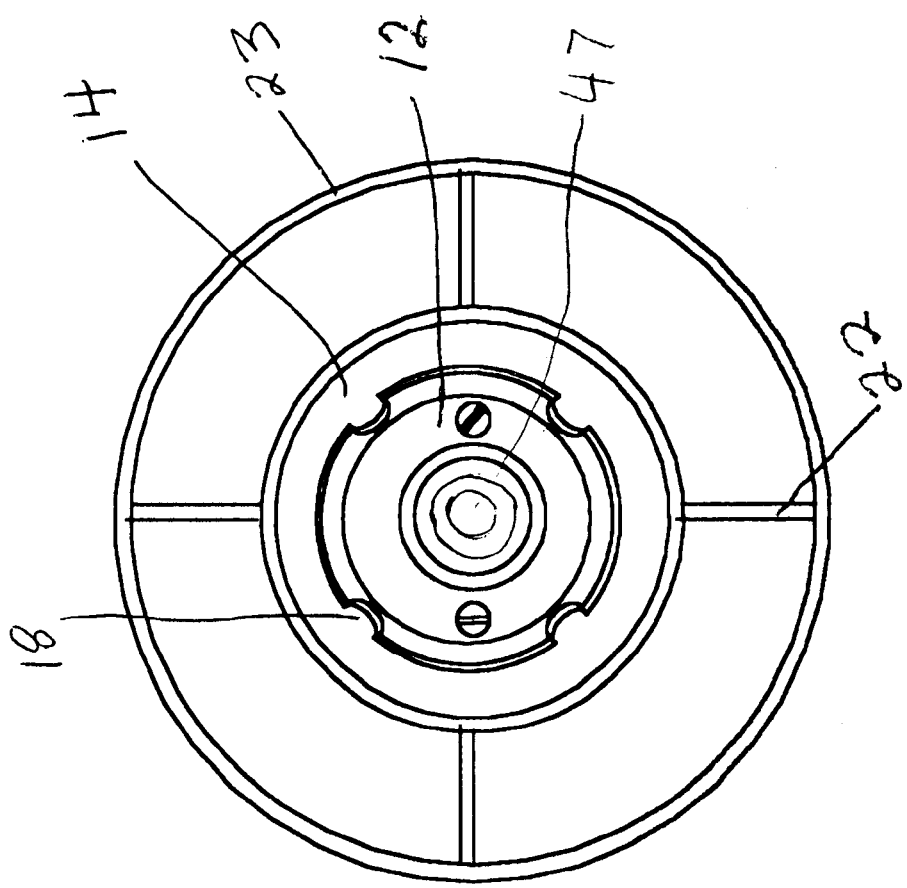
FIG. 3 is a cut away view taken along lines 3—3 of of FIG. 2.

Positioned below top 10 and having an upper region enclosed thereby is a reservoir 12 sized to hold approximately 4 pounds of feed. This quantity of bird feed is sold in many retail outlets in the same gallon-sized plastic container used in the sale of milk and distilled water. The entire contents of the gallon-sized bird feed container may be emptied into reservoir 12, providing enough feed to last for a month or so, depending on the number of birds visiting the birdfeeder. Significantly, reservoir 12, in the disclosed embodiment, is configured as an inverted cone, so that most of the bird feed is contained substantially above and over the birdfeeder base, as shown in FIG. 2. The diameter of base 14 is about 7 inches, a diameter of less than half the diameter of top 10. This determines the bird feed held by base 14, and gives the feed and birds at base 14 better protection from precipitation than such protection afforded by conventional bird feeders.

The inwardly tapered shape of reservoir 12 enlarges the available area beneath top 10 that is sheltered from precipitation. Below reservoir 12 is mounted base 14, which base being provided with one or more cavities 16 for receiving bird feed from reservoir 12. One or more openings 18 at the bottom of reservoir 12 communicate with a cavity dished out around an upper side of base 14 or a plurality of spaced apart cavities, allowing bird feed to pass into cavity 16 by gravity as the bird feed is consumed. A circular perch 23, supported by spokes 22, extends around the base in position to attract the birds and to facilitate their feeding. The perch may be placed at different distances from the base to attract a particular size of bird. A plurality of linear perches having an inner end embedded in in the base may also be used. Where the perches are small, larger birds are discouraged from using the birdfeeder, while smaller birds are attracted thereto.

The birdfeeder may be supported from above by means of a ring 20 or a similar device positioned above top 10 connected to lock rod 24 for suspending from a hook or cord (not shown). Ring 20 includes a threaded portion 27 threaded onto a threaded stud 28. Stud 28 passes through an opening 30 in top 10, so that with top 10 in place between ring 20 and end 26 of rod 24, the described parts are held together as one integral subassembly 21.

By use of a post mount 35 the birdfeeder may be mounted from underneath on a post 41. The mount 35 is attached to the base by fasteners extending through openings in a flange 65 of post mount 35. A stop 39 may be provided to limit the extent of incursion of a post within the mount. A sloped ramp or other similar structure 43 may be provided above stop 39, along with an opening 45 in mount 35 at a lower end of ramp 43. An opening 47 is provided in the bottom of base 14 communicating with the interior of support tube 32 and enabling any feed that is inadvertently spilled in the tube to fall downward onto the ramp, which directs the feed outward through an opening 45 where it falls outside of the birdfeeder.

This provision of a passageway in the base to allow spilled bird feed to fall out of the support tube prevents the bird feed from clogging tube 32, which clogging could otherwise keep upper assembly 21 from being replaced, and further prevents bird feed from accumulating in the tube and developing into an unsanitary condition due to molding and rotting of bird feed within the tube.

A locking mechanism 40 for releasably securing the upper portion 21 and lower portion 25 together is also provided. This locking mechanism is generally housed in a tube 49 which may extend through an opening 61 in reservoir 12. Tube 49 is provided with a flange portion 55 configured to conform to the curve of support tube 32. Flange portion 55 is attached to support tube 32 as by a rivet, or by bonding or welding if the parts are made of metal. The housing and flange may also be made of plastic material, in which case adhesive bonding would be preferred. Thus, tube 49 is permanently affixed at one end to support tube 32 and is supported at the other end at opening 61 in the reservoir. Tube 49 may also be attached to support tube 32 by other means such as a threaded fastener.

Figure 4:
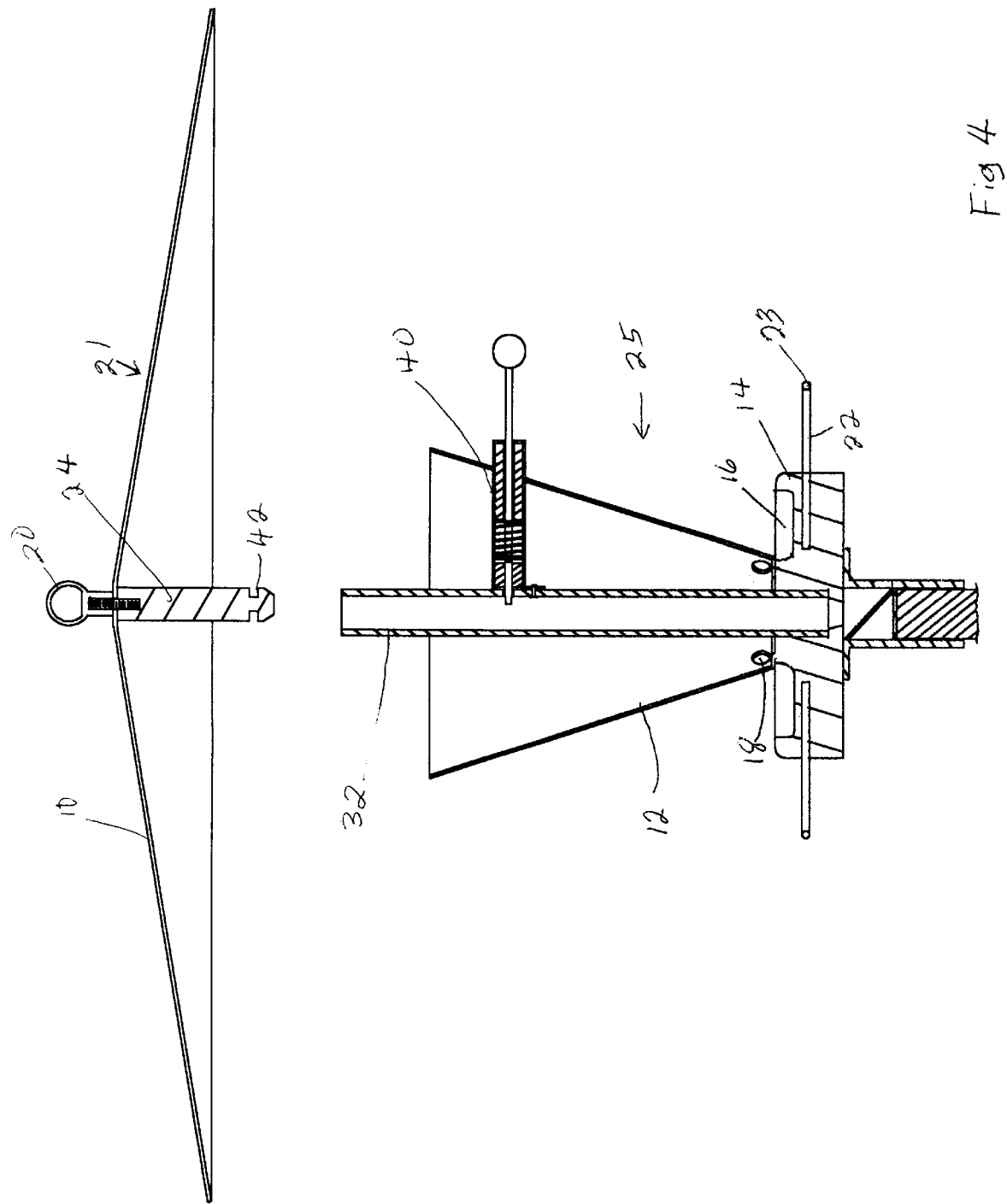
FIG. 4 is is a broken away view showing the birdfeeder in separated condition.

As shown in FIG. 2, a rod 38 having a grip such as a knob 38a extends through tube 49 and terminates at an opposite interior end 51. End 51 in turn extends through an opening 63 communicating with a groove 42 in locking rod 24 of upper portion 21. A plug 67 is provided within tube 49, plug 67 having a bore 44 through which rod 38 extends. A compression spring 46 is fitted as shown in tube 49, which compression spring is positioned to bear at one end against a washer 52 held in place by a pin 70 which passes radially through rod 38. A second plug 50 is provided through which locking member rod 38 extends, plug 50 serving to limit the inward(to the left) travel of rod 38 so that spring 46 is maintained within a recess between plugs 67 and 50. With this construction, when rod 38 is pulled outward against the bias of spring 46, end 51 of rod 38 is disengaged from groove 42, allowing lock rod 24 to be released and thus upper portion 21 to be separated from lower portion 25 as shown in FIG. 4.

While the invention is described in terms of specific embodiments, it is to be understood that various changes and modifications may be made by one skilled in the art without departing from the scope of the invention, which is limited only as indicated by the appended claims. In particular, the locking mechanism for engaging and releasing the subassemblies may comprise other devices such as a lever mounted on the reservoir at a different location.

What is claimed is:

1. A bird feeder comprising:
    a first subassembly further comprising:
        a protective top configured for protecting exposed bird feed and birds therebeneath from precipitation;
        a lock rod attached at one end to said protective top and configured at an opposite end for receiving a locking member;
    a second subassembly comprising:
        a base having at least one open cavity for receiving and holding said bird feed, said base, when said birdfeeder is assembled, being protected from precipitation by said protective top;
        a bird feed reservoir attached to said base and said reservoir having at least one opening in communicating relation with said cavity of said base so that said bird feed flows from said reservoir into said cavity as it is consumed;
        a tubular member extending from said base and positioned within said reservoir for receiving said lock rod so that said lock rod may extend downward within said tubular member over a partial distance thereof, said tubular member having an aperture defined therein for passage of a said locking member;
        a locking mechanism including a locking member engageable with said lock rod and means operable for actuating said locking mechanism;
    means for supporting said birdfeeder at a predetermined location;
    said tubular member having defined an open space therein at a location between said bottom end of said lock rod when said lock rod is in engaged position therein and said base for receiving feed spilled into the tubular member; and
    a means of communicating said open space with an external location, whereby said spilled feed is removed from said tubular member.

2. A birdfeeder as defined in claim 1 wherein said reservoir has an inverted frusto conical configuration.

3. A birdfeeder as defined in claim 1 wherein said locking mechanism is disposed in a housing having an inner end and an outer end, said inner end is attached to said tubular member and said outer end is attached to a wall of said reservoir.

4. A birdfeeder as defined in claim 3 wherein said outer end of said housing extends through an aperture in said wall.

5. A birdfeeder as defined in claim 4 wherein said lock rod has defined therein a groove adjacent said opposite end and said locking mechanism includes an axially disposed rod engageable with said groove.

6. A birdfeeder as defined in claim 5 wherein said locking mechanism comprises a compression spring biasing said rod inward through an opening in said tubular member for engagement in said groove of said lock rod.

7. A birdfeeder as defined in claim 1 wherein said means for supporting said birdfeeder comprises a fixture located on top thereof and adapted for being connected to an external source from above.

8. A birdfeeder as defined in claim 7 wherein said fixture is a ring.

9. A birdfeeder as defined in claim 1 wherein said means for supporting said birdfeeder comprises a mount attached underneath said base and adapted to be installed on a post.

10. A birdfeeder as defined in claim 1 wherein said means communicating said open space with an external location comprises an aperture defined in said base.

11. A birdfeeder as defined in claim 1 wherein said lock rod has a length of ¼ to ½ the length of said tubular support member.

12. A birdfeeder as defined in claim 1 comprising a perch connected to said base.

* * * * *